United States Patent
Van Veen et al.

(10) Patent No.: US 9,316,438 B2
(45) Date of Patent: Apr. 19, 2016

(54) METHOD AND ASSEMBLY FOR HANDLING CONTAINERS IN A FREEZE DRYER

(75) Inventors: Johannes Van Veen, Poederoijen (NL); Franciscus Antonius Damen, Langeweg (NL); Alexander Clemens Henricus Josef Schaepman, Langeweg (NL); Florentinus Adriaan Cornelis Marie Jongenelen, Breda (NL)

(73) Assignee: I. M. A. INDUSTRIA MACCHINE AUTOMATICHE S.P.A., Bologna (IT)

( * ) Notice: Subject to any disclaimer, the term of this patent is extended or adjusted under 35 U.S.C. 154(b) by 1026 days.

(21) Appl. No.: 13/389,072

(22) PCT Filed: Jul. 21, 2010

(86) PCT No.: PCT/EP2010/060557
§ 371 (c)(1),
(2), (4) Date: Mar. 12, 2012

(87) PCT Pub. No.: WO2011/015453
PCT Pub. Date: Feb. 10, 2011

(65) Prior Publication Data
US 2012/0159803 A1 Jun. 28, 2012

(30) Foreign Application Priority Data

Aug. 7, 2009 (NL) ...................................... 2003338

(51) Int. Cl.
*F26B 5/06* (2006.01)
*B65G 47/82* (2006.01)
*F26B 25/00* (2006.01)

(52) U.S. Cl.
CPC . *F26B 5/06* (2013.01); *B65G 47/82* (2013.01); *F26B 25/001* (2013.01)

(58) Field of Classification Search
CPC .......... F26B 25/001; F26B 25/06; F27D 3/06; F27D 3/003; F27D 3/18; B65G 1/0435; B65G 49/085; B65G 65/00
See application file for complete search history.

(56) References Cited

U.S. PATENT DOCUMENTS 4,132,305 A * 1/1979 Mastak .......................... 198/432
4,506,455 A * 3/1985 Rossi ............................... 34/285

(Continued)

FOREIGN PATENT DOCUMENTS

DE       89 00 750 U1     3/1989
DE     198 23 167 A1    12/1999

(Continued)

*Primary Examiner* — Kaitlin Joerger
(74) *Attorney, Agent, or Firm* — Ladas & Parry LLP

(57) ABSTRACT

Method for transfer of containers, such as vials (101), between a freeze dryer (1) that is located at a first location and a separate transport vehicle (30) that is mobile with respect to the freeze dryer, wherein the freeze dryer (1) comprises a freeze dryer housing (2) with an access opening (11) towards an inner freeze drying chamber (10) inside the freeze dryer housing (2), multiple shelves (21-24) that are arranged spaced apart above each other inside the freeze dryer chamber (10) and each provided with a horizontally extending first flat supporting surface (25) for supporting the containers, wherein the mobile transport vehicle (30) comprises a mobile undercarriage (31) supporting a storage housing (33) with an access opening (40) towards an inner storage chamber (39), a carrier provided with a second flat supporting surface (58) for supporting the containers inside the storage housing (33), and a container shifter (60) for pushing out containers away from the second flat supporting surface (58) in a pushing out direction parallel to the second flat supporting surface (58).

26 Claims, 9 Drawing Sheets

(56) References Cited

U.S. PATENT DOCUMENTS

| | | | |
|---|---|---|---|
| 4,815,921 A * | 3/1989 | Yamamoto et al. | 414/331.18 |
| 5,129,162 A * | 7/1992 | Hemmersbach et al. | 34/284 |
| 5,261,774 A * | 11/1993 | Le Floc'h et al. | 414/331.17 |
| 5,409,097 A * | 4/1995 | Hoegger | 198/463.2 |
| 5,421,686 A * | 6/1995 | Covert et al. | 414/287 |
| 5,649,800 A * | 7/1997 | Hemmersbach et al. | 414/180 |
| 7,695,230 B2 * | 4/2010 | Selch | 414/180 |
| 2009/0019724 A1 * | 1/2009 | Wagner et al. | 34/573 |
| 2014/0230265 A1 * | 8/2014 | Christ | 34/284 |

FOREIGN PATENT DOCUMENTS

| | | |
|---|---|---|
| DE | 203 13 941 U1 | 12/2004 |
| DE | 20 2008 012379 U1 | 12/2008 |
| EP | 0 391 208 A1 | 10/1990 |
| EP | 0 618 417 A1 | 10/1994 |
| EP | 1 712 859 A2 | 10/2006 |
| JP | 8 113313 A | 5/1996 |

* cited by examiner

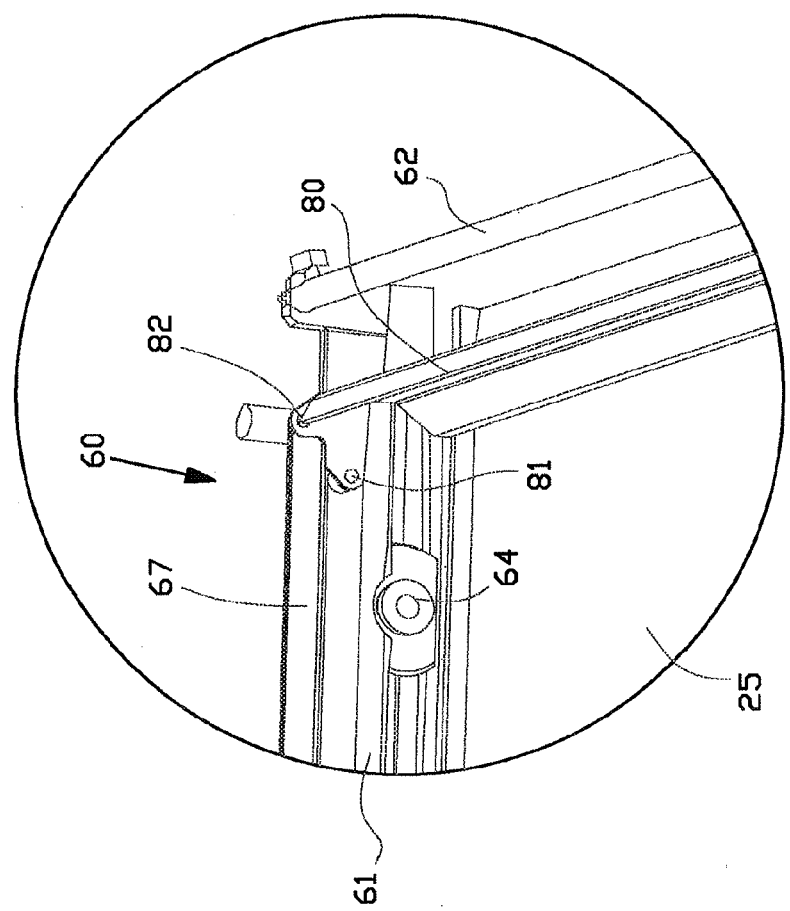

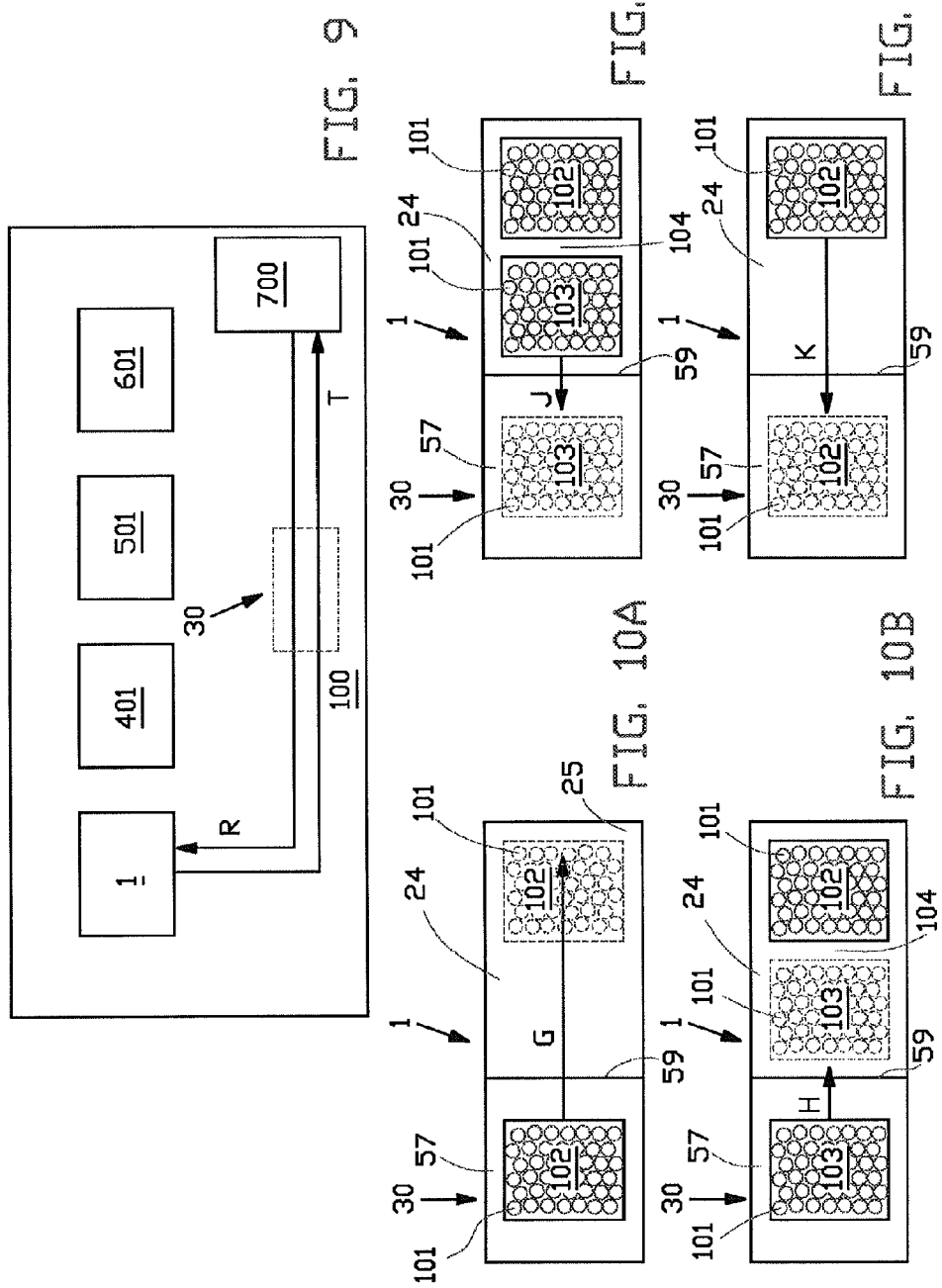

METHOD AND ASSEMBLY FOR HANDLING CONTAINERS IN A FREEZE DRYER

RELATED APPLICATION INFORMATION

This application is a 371 of International Application PCT/EP2010/060557 filed 21 Jul. 2010 and entitled "METHOD AND ASSEMBLY FOR HANDLING CONTAINERS IN A FREEZE DRYER", which was published in the English language on 10 Feb. 2011, with International Publication Number WO 2011/015453 A1, and which claims priority from Netherlands Patent Application 2003338, filed 7 Aug. 2009.

BACKGROUND

The invention relates to a method and a device for handling vials in a freeze dryer.

A freeze dryer is used for freeze drying pharmaceutical fluids that are contained in vials. The freeze dryer comprises a freeze drying chamber having multiple shelves that are arranged spaced apart above each other, wherein the shelves each carry one container pack of compactly and orderly arranged, mutually abutting containers. In a typical freeze drying facility multiple freeze dryers are positioned along a horizontal rail track inside a clean room, wherein a loading vehicle moves along the rail track for loading and unloading the vials. The loading vehicle comprises a carrier plate having substantially the same size as a shelf and is configured for per shelf transferring the sole container pack between the shelf and the carrier plate in one single stroke.

The clean room of the freeze drying facility has to comply with high standards regarding cleaning and sanitization, and therefore the available floor space has to be occupied in an efficient manner. However, in the known freeze drying facility the carrier plate of the loading vehicle has substantially the same size as a shelf. Therefore the loading vehicle itself and the suitable rail track for the loading vehicle occupies a relatively large portion of the available floor space. Moreover, the rail track has to be positioned extremely accurate with respect to the freeze dryers in order to ensure that the carrier can be properly aligned with each of the shelves. In particular when the freeze drying facility is extended, the positioning of added freeze dryers with respect to an added rail track portion is time consuming.

It is an object of the invention to provide provisions for a freeze drying facility to occupy the available floor space of the clean room in an efficient manner.

It is an object of the invention to provide provisions for a freeze drying facility in order to extend the freeze drying facility in an efficient manner.

SUMMARY OF THE INVENTION

According to one aspect, the invention provides a method for transfer of containers, such as vials, between a freeze dryer that is located at a first location and a separate transport vehicle that is mobile with respect to the freeze dryer, wherein the freeze dryer comprises a freeze dryer housing with an access opening towards an inner freeze drying chamber inside the freeze dryer housing, multiple shelves that are arranged spaced apart above each other inside the freeze dryer chamber and each provided with a horizontally extending first flat supporting surface for supporting the containers, wherein the mobile transport vehicle comprises a mobile undercarriage supporting a storage housing with an access opening towards an inner storage chamber, a carrier provided with a second flat supporting surface for supporting the containers inside the storage housing, and a container shifter for pushing out containers away from the second flat supporting surface in a pushing out direction parallel to the second flat supporting surface, wherein the method comprises for a first shelf aligning the carrier and the shelf and by means of the container shifter pushing out a first container pack of multiple mutually abutting containers from the second flat supporting surface onto the first flat supporting surface of the first shelf, reversing the container shifter and subsequently pushing out a second container pack of multiple mutually abutting containers from the second flat supporting surface onto the first flat supporting surface of the first shelf while leaving an elongated separation space free between the first container pack and the second container pack on the first shelf. The mobile transport vehicle can be an Automated Guided Vehicle (AGV) instead of a rail track guided vehicle.

By operating a freeze drying facility according to the method of the invention, the shelves are filled with distinct container packs that are separated with an elongated separation space, wherein the mobile transport vehicle can load or unload one container pack at a time. As will be clear, the invention is not limited to two container pack per shelf. The size of the second flat supporting surface of the vehicle can be a portion of the size of the first flat supporting surface of the shelves, and therefore the size of the mobile transport vehicle itself can be a portion of the size of the freeze dryers. This also applies to the floor space that is used by the transport vehicle to move between freeze dryers. This enables to occupy the available floor space with more freeze dryers, or the size of the clean room can be reduced.

In an embodiment the separation space extends transverse to the pushing out direction.

In an embodiment the separation space has in the pushing out direction a width that is substantially equal or larger than the largest outer width of one of the containers in that direction.

In an embodiment the containers of the container packs are arranged in rows that extend transverse to the pushing out direction, wherein the successive rows are mutually staggered transverse to the pushing out direction half a container width. The staggering of successive rows enables a compact arrangement of the containers.

In an embodiment the containers are identical regarding size and shape.

In an embodiment the method comprises, after pushing out the first container pack onto the first flat supporting surface, moving the transport vehicle to a loading station that is located at a second location at a distance or remote from the first location and loading the second container pack onto the second flat supporting surface. In this manner each container pack is picked up at the loading station and loaded on a shelf.

In an embodiment the method comprises, after loading the first and second container pack onto the shelve or shelves, running a dry freezing process inside the freeze dryer in order to conserve a pharmaceutical content of the containers for a long period of time.

In an embodiment the container shifter comprises a container pushing shovel that is moveable in the pushing out direction for engagement of a side of the container pack. The container pushing shovel can engage the container pack at the side and shift it out as one unity in one single shovel stroke.

In an embodiment the method comprises, after loading the first and second container pack onto the shelf or shelves, unloading the container packs from the shelve or shelves by means of the transport vehicle. The unloading can be done after a freeze drying process has been run inside the freeze dryer.

In an embodiment thereof the method comprises per shelf aligning the shelf and the carrier and by means of the container shifter pulling in the second container pack from the first flat supporting surface onto the second flat supporting surface in a pulling in direction parallel to the second flat supporting surface, extending the container shifter in an extending direction opposite the pushing in direction and subsequently pulling in the first container pack from the first flat supporting surface onto the second flat supporting surface.

In a further embodiment thereof the container shifter comprises a container pulling shovel that is moveable in the pulling in direction and that is moveable in a direction, transverse to the pulling in direction between a passing over position in which the container pulling shovel passes freely over the first or second container pack in the extending direction and a lower shovel position in which the container pulling shovel engages a side of the first or second container pack in the pulling in direction, wherein the method comprises moving the container pulling shovel in its passing over position in the extending direction towards and past the side of the first or second container pack, moving the container pulling shovel in the shovel position and moving the container pulling shovel in the pulling in direction for engagement of the side of the first or second container pack, and pulling in the container pack along the first flat support surface.

In a further embodiment thereof the container shifter comprises a detector for detecting an engagement of the container pulling shovel onto a container, wherein the method comprises moving the container pulling shovel from the passing over position towards the shovel position while detecting an engagement of the container pulling shovel onto a container, wherein the movement of the container pulling shovel is stopped or reversed when an engagement of the container pulling shovel onto a container is detected before the container pulling shovel has reached its shovel position. Continuing the scooping and pulling in the containers while the container pulling shovel is not yet in its lower shovel position would lead to an uncontrolled shifting movement of the container pack with multiple fallen and damaged containers, which is hereby prevented.

In an embodiment thereof the method comprises reversing the movement of the container pulling shovel when the engagement of the container pulling shovel and the container is detected before the container pulling shovel has reached its lower shovel position, moving the container pulling shovel in the extending direction over a distance which is less than the largest outer width of a container, and moving the container pulling shovel towards the shovel position again while detecting an engagement of the container pulling shovel onto a container. In this manner the container pulling shovel can attempt to scoop into the elongated separation space on a position which is shortly aside a fallen or unintentionally displaced side container of the container pack, whereby the lower shovel position can be reached and the displaced side container can be brought back into its planned position at the side of the container pack during the shifting movement.

In an embodiment thereof the method comprises repeating said reversing the movement of the container pulling shovel when an engagement of the container pulling shovel onto a container is detected before the container pulling shovel has reached its shovel position, said moving the container pulling shovel in the extending direction over a distance which is less than the largest outer width of a container, and said moving the container pulling shovel towards the shovel position while detecting an engagement of the container pulling shovel onto a container until the container pulling shovel has reached the shovel position or until a predetermined maximum number of attempts have passed. In the exceptional case the predetermined maximum number of attempts has been reached, an operator can evaluate the situation and take the necessary measures or correct manually.

As already mentioned the method can comprise, for the second container pack, moving the container pulling shovel to the shovel position by insertion into the elongated separation space.

In an embodiment the method comprises, after pulling in the second container pack onto the second flat supporting surface, moving the transport vehicle to a discharging station that is located at a third location at a distance or remote from the first location and discharging the second container pack from the second flat supporting surface.

According to another aspect, the invention provides an assembly of a freeze dryer and a separate transport vehicle that is mobile with respect to the freeze dryer, wherein the freeze dryer comprises a freeze dryer housing with an access opening towards an inner freeze drying chamber inside the freeze dryer housing, multiple shelves that are arranged spaced apart above each other inside the freeze dryer chamber and provided with a horizontally extending first flat supporting surface for supporting containers, such as vials, and a side edge in front of the access opening, wherein the mobile transport vehicle comprises a mobile undercarriage supporting a storage housing with an access opening towards an inner storage chamber, a carrier provided with a second flat supporting surface for supporting the containers inside the storage housing, and a container shifter for pushing out containers away from the second flat supporting surface in a pushing out direction parallel to the second flat supporting surface, wherein the carrier comprises a plate shaped abutment extension on which a part of the second flat supporting surface or its elongation extends, a front mounting part under the abutment extension, and a gripping extension that is connected to the front mounting part and that is at least partly directed towards the abutment extension, wherein the transport vehicle is configured for aligning the carrier with one of the shelves on a vertical height in which the abutment extension extends above the first flat supporting surface and the gripping extension at least partly extends under the side edge, and for moving the carrier towards that shelf in order to confine the side edge between the abutment extension and the gripping extension.

The side edge is confined between the plate shaped abutment extension and the gripping extension that at least partly faces the abutment extension. That is, a part of the second flat supporting surface or its elongation lands down on the first flat supporting surface of the shelf, thereby pushed down by the gripping extension. In this manner it is sufficient to bring the abutment extension to some extend above the first flat supporting surface to enable a smooth transfer of containers between the first and second flat supporting surface. This makes it in particularly possible to embody the transport vehicle as an Automated Guided Vehicle (AGV) instead of a rail track guided vehicle.

In an embodiment thereof the gripping extension comprises a gripper that is provided with a freely extending engagement end for engagement of the side edge, wherein the engagement end is moveable with respect to the abutment extension in a vertical plane. The gripper can then convert a horizontal docking movement of the abutment extension into a vertical downward landing movement.

In an embodiment the gripper is hingeably connected to the mounting part.

In an embodiment thereof the engagement end is provided with a recession for confinement of at least a part of the side edge in order to ensure a proper engagement of the side edge.

In an embodiment the gripping extension is made of a resilient material, preferably a rubber based material, thereby allowing to continue a horizontal docking movement of the abutment extension when the abutment extension has come into abutment with the first surface in order to push the abutment extension spring loaded into firm contact with the first surface.

In an embodiment the transport vehicle is provided with multiple gripping extensions that are distributed along the abutment extension, so that a firm confinement can be obtained over the entire length of the abutment extension.

In an embodiment the transport vehicle is provided with a translation mechanism for supporting and linearly translating the carrier with respect to the undercarriage in a horizontal direction through the access opening of the storage housing, wherein the carrier is slidably supported on the translation mechanism for a swivelling movement of the carrier with respect to the translation mechanism in a horizontal plane. The swivelling motion enables the carrier to align with the shelf in a horizontal plane while docking at the shelf.

In an embodiment thereof the transport vehicle is provided with two spaced apart springs that at the side of the abutment extension connect the carrier to the translation mechanism, wherein the springs each allow a translation of a front part of the carrier with respect to the translation mechanism in the translating direction of the translation mechanism. The springs maintain a spring load or biasing load between the shelf and the carrier to maintain the docking engagement.

In an embodiment thereof the transport vehicle dampers for damping the movement of the springs. The damping action can prevent tilting of containers during docking.

In a simple embodiment the springs are damped gas springs.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIG. 5 is an isometric view of a detail of the front part of the mobile transport vehicle as indicated in FIGS. 2 and 3;

FIG. 9 is a floor plan comprising multiple freeze dryers and the mobile transport vehicle according to the preceding figures;

FIGS. 10A and 10B are schematic plane views of loading the freeze dryer by means of the mobile transport vehicle according to the preceding drawings; and FIGS. 11A and 11B are schematic plane views of unloading the freeze dryer by means of the mobile transport vehicle according to the preceding drawings.

DETAILED DESCRIPTION OF THE DRAWINGS

Figure 1:
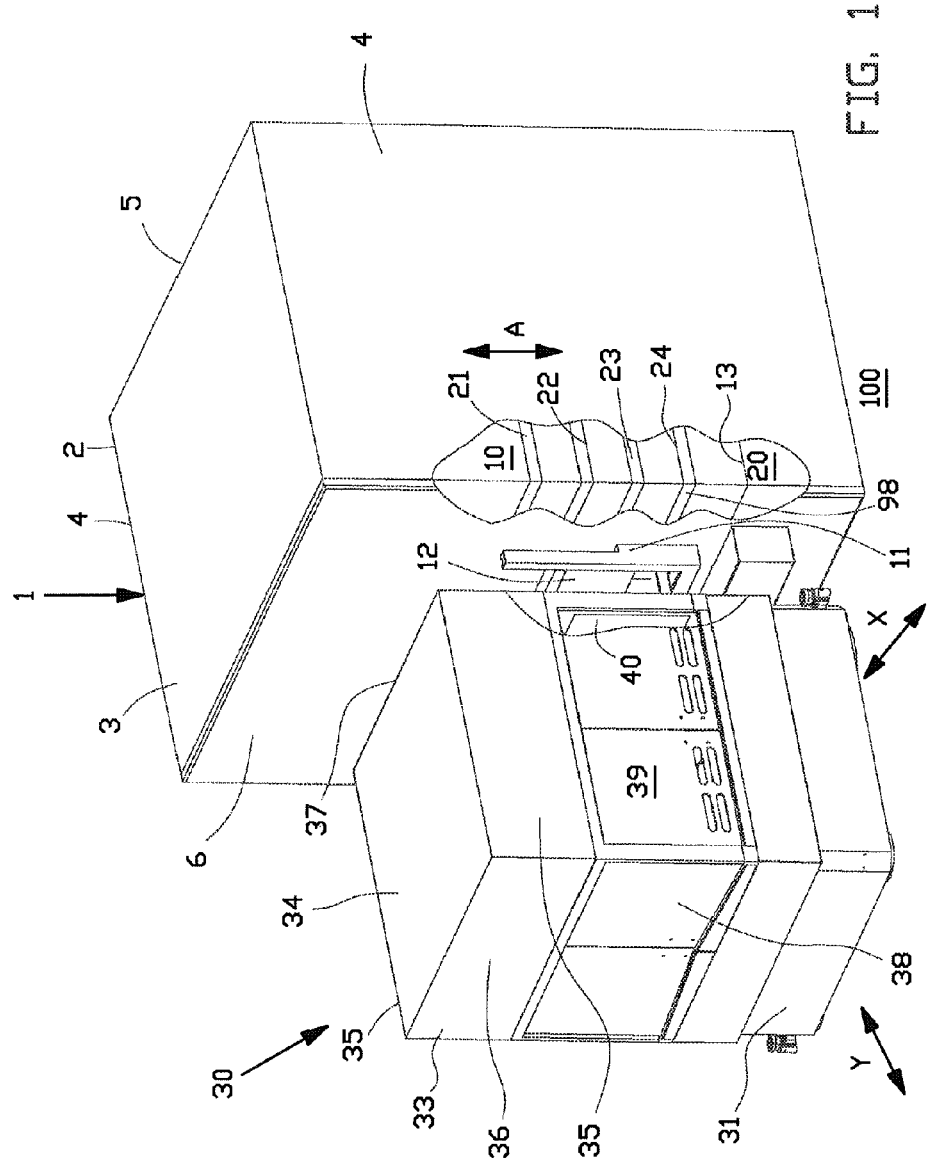
FIG. 1 is an isometric view of a freeze dryer having multiple shelves and a mobile transport vehicle that is docked onto one of the shelves.

FIG. 1 shows a floor 100 of a clean room having a freeze dryer 1 for freeze drying pharmaceutical materials that are contained in identical containers, in this example glass vials. Dry freezing pharmaceutical materials as such is known from the art. The freeze dryer 1 comprises a freeze dryer housing 2 having a top wall 3, two side walls 4, a back wall 5, a front wall 6 and an internal partition wall 13 that define an inner freeze drying chamber 10 and an inner equipment chamber 20. In the front wall 6 a rectangular access opening 11 is provided which can be opened and closed by a vertically slidable door 12. The freeze drying chamber 10 is equipped for the accommodation of vials and is intended for carrying out the freeze drying process, and comprises multiple horizontally extending plate shaped shelves 21, 22, 23, 24 that can be translated in vertical direction A in order to be brought in front of the access opening 11. As shown, the side edge 98 of the fourth shelf 24 extends freely accessible in front of the access opening 11. The freeze drying chamber 10 complies with the very high sterility standards for freeze drying pharmaceutical materials.

Figure 2:
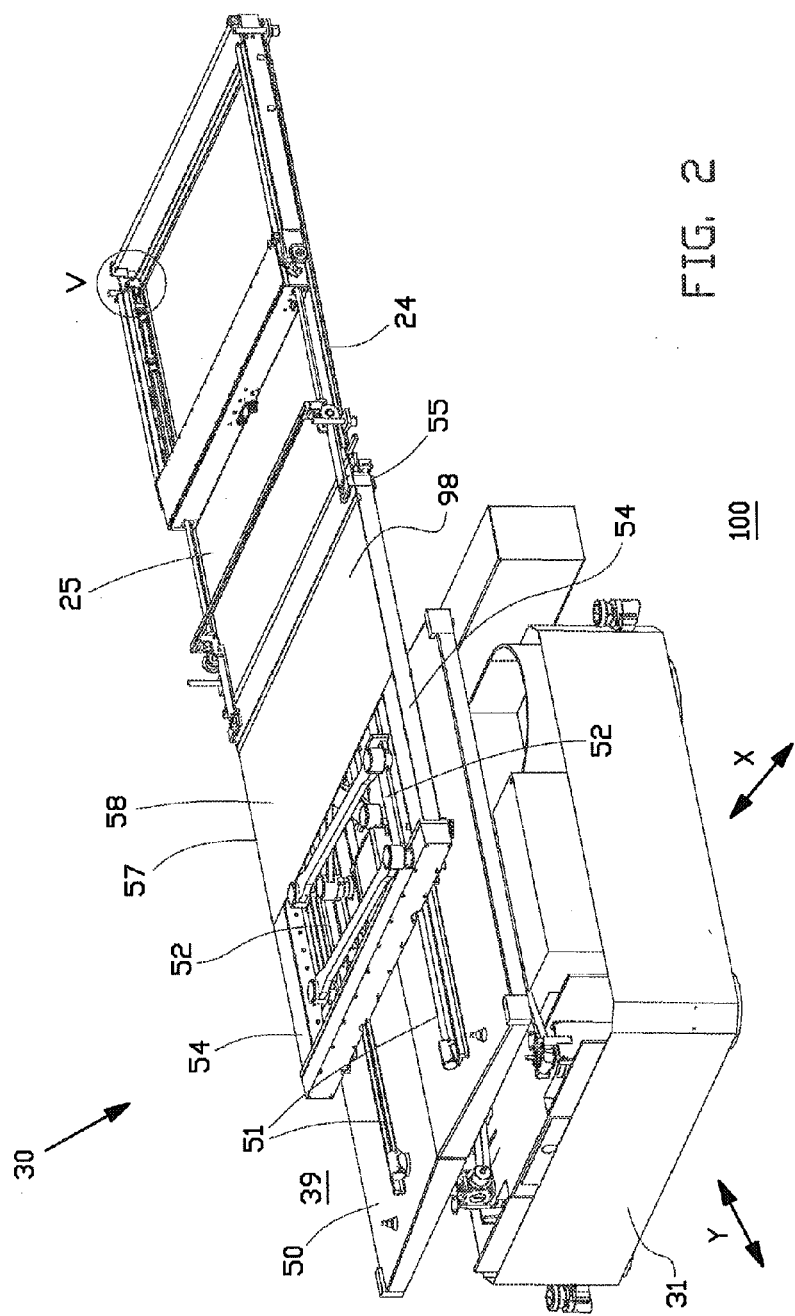
FIGS. 2, 3 and 4 are different isometric views of the mobile transport vehicle as shown in FIG. 1, wherein the upper parts have been removed to show the parts that are relevant for the invention, and only the shelf of the freeze dryer onto which the mobile transport vehicle is docked.
Figure 3:
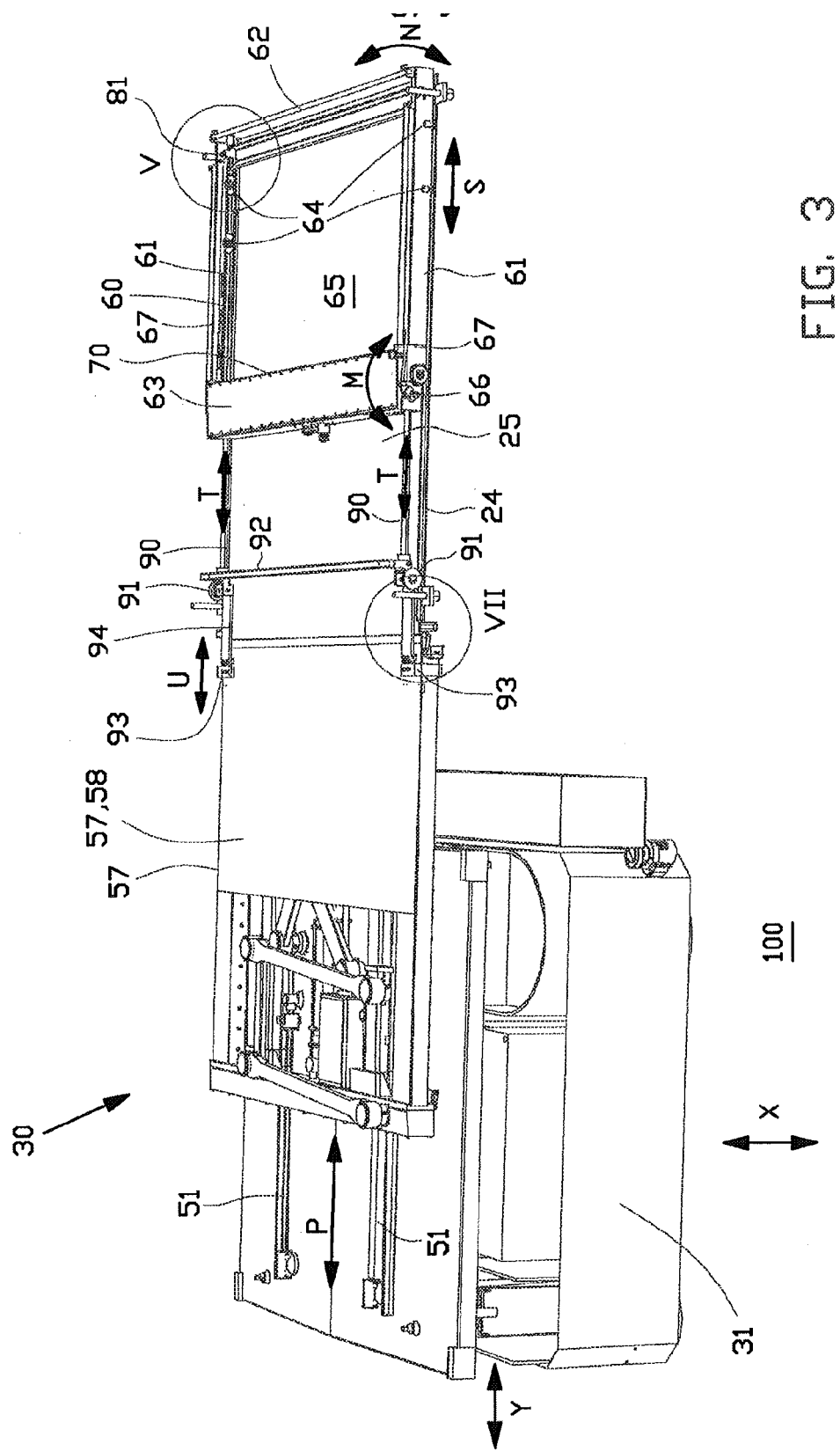
Figure 4:
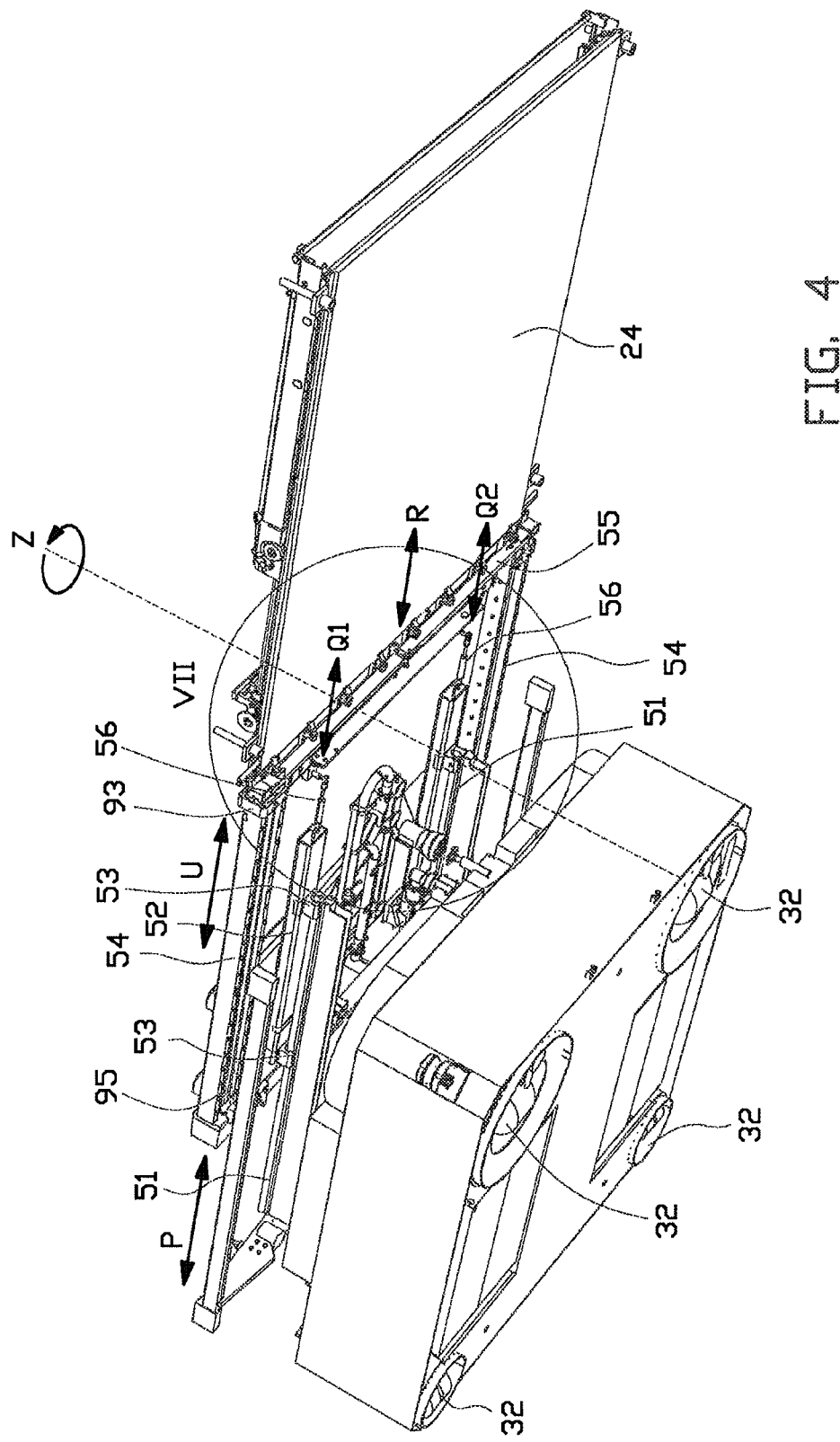

FIG. 1 further shows a transport vehicle 30 that is moveable over the floor 100 in order to load and unload the vials in the freeze dryer 1. The transport vehicle is shown in more detail in FIGS. 2-4. The transport vehicle 30 comprises an undercarriage 31 having wheels 32 that are individually driven and steered by servo motors which are powered by an electronic controller. The undercarriage 31 is able to move over the floor 100 in any horizontal direction X, Y with respect to the freeze dryer 1 in a controlled manner, based on signals from transponders in the floor 100, sensors on the undercarriage and commands that are sent by a floor control station that is not shown, making the transport vehicle 1 an Automatic Guided Vehicle (AGV). The undercarriage 31 supports a storage housing 33 having a top wall 34, two side walls 35 and a back wall 36 that are provided with transparent inspection panels 38, and a front wall 37 that define an inner storage chamber 39. In the front wall 37 an access opening 40 is provided which can be opened and closed by a vertical sliding door that is not shown. The storage chamber 39 and its inner parts complies with the very high sterility standards for freeze drying pharmaceutical materials. FIGS. 2-4 show the transport vehicle 30 having the storage housing 33 removed in order to show the relevant parts inside the storage chamber 39. The freeze dryer 1 has been removed in its entirety except for one of the shelves 24 in order to disclose the engagement of this shelf 24 by the transport vehicle 30 during loading and unloading vials.

The transport vehicle 30 comprises a support base 50 with two parallelly extending rails 51 on top of the undercarriage 31. Above the rails 51 the transport vehicle 30 comprise two paralleling extending carrier bars 52 that are supported by a pair of sliders 53 that can slide simultaneously along the rails 51 in direction P by means of a first linear servo motor which is not shown. On its top side the carrier bars 52 support a rectangular framework 54 in a free sliding manner. The framework 54 comprises a front bar 55 forming a front mounting part that is connected to the carrier bars 52 by means of two gas springs 56 that extend in the longitudinal direction of the carrier bars 52 and the rails 51. The gas springs 56 are biased towards their extended position. The gas springs 56 can be retracted individually counter their biasing force in direction Q1, Q2 by an external force in order to allow the frame 54 to slide over the carrier bars 52 with a movement having a swinging rotation component around a vertical axis Z and a horizontal translating component R parallel to the translation direction P of the frame 54. Above the frame 54 a carrier comprising a flat metal vial support plate 57 is mounted. The vial support plate 57 comprises a flat, horizontally extending, smooth vial supporting surface 58.

The transport vehicle 30 comprises a vial shifter 60 that is Movable over the vial support plate 57 and the shelf 24 in horizontal direction S as will be explained hereafter. The vial shifter 60 comprises two paralleling extending frame bars 61 that are provided with wheels 64 for guided movement along a straight line in direction S. The frame bars 61 are coupled by a coupling rod 62 and a drive housing 63 to define a rectangular vial pack enclosing area 65. The drive housing 63 is connected to a straight vial pushing shovel 70 facing the vial pack enclosing area 65 along its full width. At the opposite side the vial shifter 60 comprises a vial pulling shovel 80 that extends over the full width of the vial pack enclosing area 65 and that is moveably connected to the frame bars 61 by means of first hinges 81.

The vial pulling shovel 80 is shown in more detail in FIGS. 5 and 6A-6C. Inside the drive housing 63 a second servo motor is provided having a lever 66 outside the drive housing 63 that is swingably moveable in direction M. The levers 66 are connected to drive rods 67 that at the opposite side are connected to the vial pulling shovel 80 by means of second hinges 82. In this manner the vial pulling shovel 80 can be swing ably moved by the second servo motor in direction N about the axis of the first hinges 81. The second servo motor is configured to perceive a rotational resistance during its swinging movement in direction N and to communicate such resistance to the controller of the mobile transport vehicle 30.

Figure 6A:
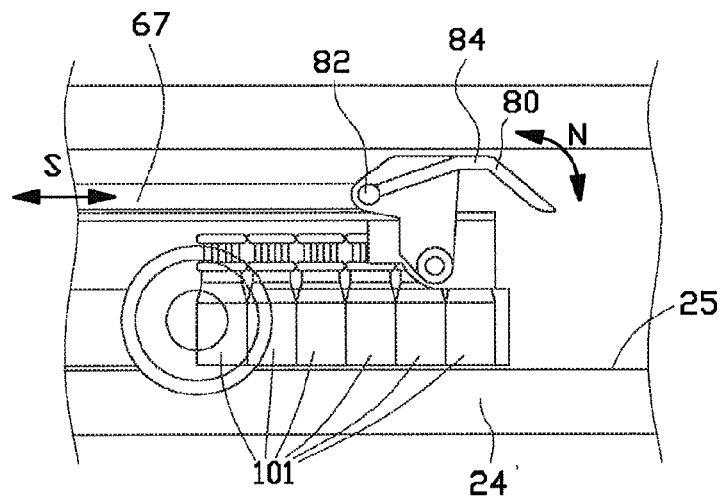
FIGS. 6A-6C are cross sections of the front part as shown in FIG. 5, in subsequent positions.
Figure 6B:
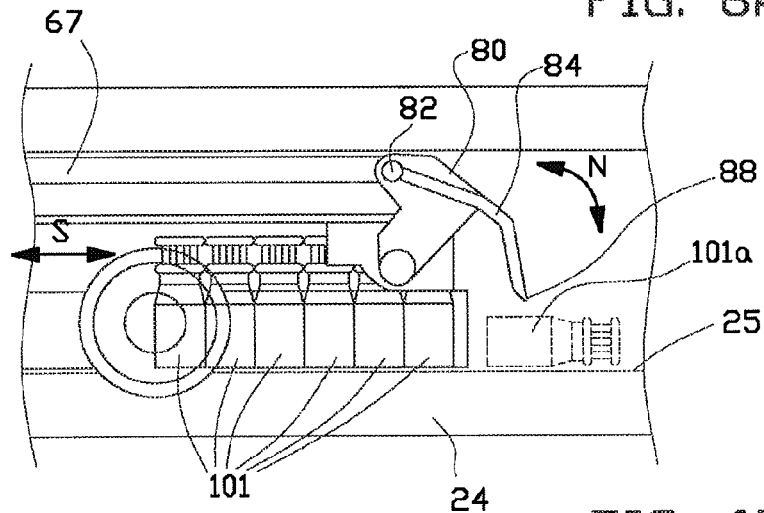
Figure 6C:
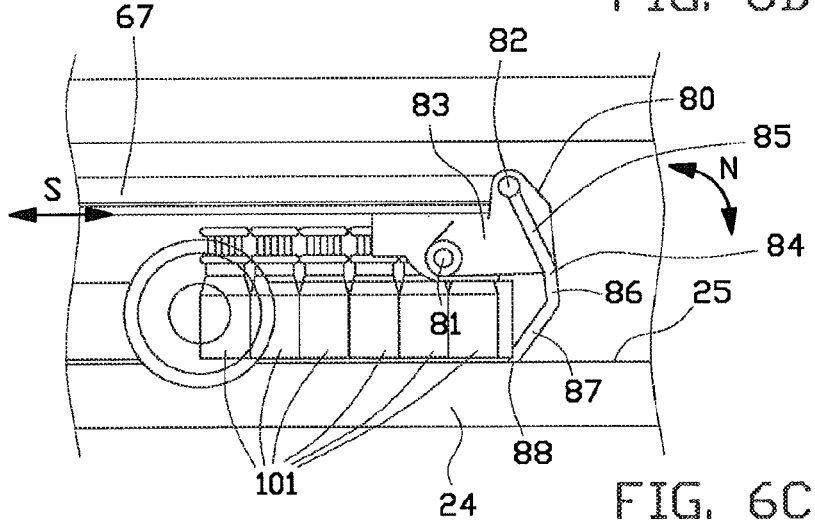

The vial pulling shovel 80 comprises two side plates 83 on which the first and second hinges 81, 82 are provided, and a plate shaped, curved scoop 84 having an elongated upper section 85, an elongated middle section 86 and an elongated lower section 87 having substantially the same distance to the axis of the first hinges 81. The lower section 87 is provided with a straight shovel edge 88. The vial pulling shovel 80 is moveable in direction N between an upper passing over position as shown in FIG. 6A, in which the vial pulling shovel 80 can pass over upright placed vials 101, an intermediate position as shown in FIG. 6B, and a lower shovel position as shown in FIG. 6C, in which the shovel edge 88 can engage the lower part of a vial 101.

As shown in FIG. 3, the vial shifter 60 comprises two drive rods 90 that are moveable into and out of the drive housing 63 in direction T by means of a third servo motor inside the drive housing 63. At the opposite side the drive rods 90 are coupled to a coupling bar 92 and supported by wheels 91. As shown in FIG. 4, two linear fourth servo motors 95 are provided under the frame 54, having an external bracket 93 that extends above the vial support plate 57 and that are moveable along the frame 54 in direction U. The brackets 93 are connected to the drive rods 90 by means of a resilient strip 94. By activation of the third and fourth servo motors, the unit comprising the frame bars 61, the coupling bar 62, the vial pulling shovel 80 and the drive housing 63 with the vial pushing shovel 70 can move in direction S over and between the vial support plate 57 and the shelve 21-24 to which the vial support plate 57 is aligned.

Figure 7:
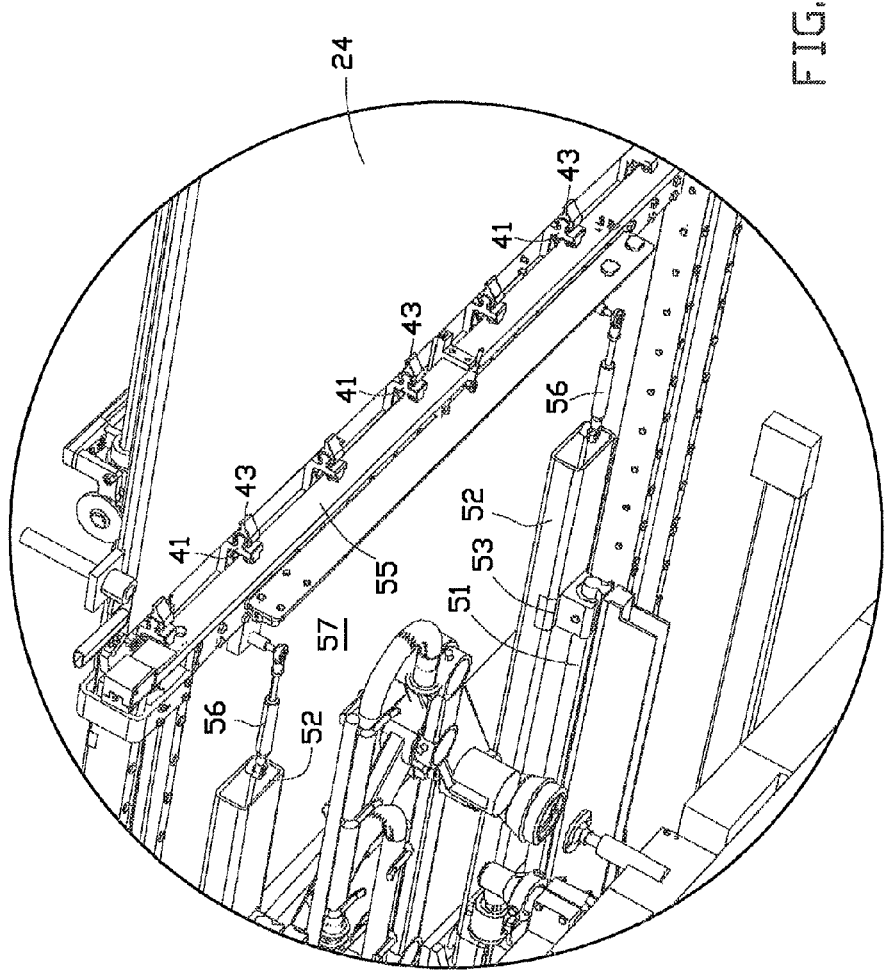
FIG. 7 is an isometric view of a detail of the docking parts of the mobile transport vehicle as indicated in FIGS. 3 and 4.
Figure 8A:
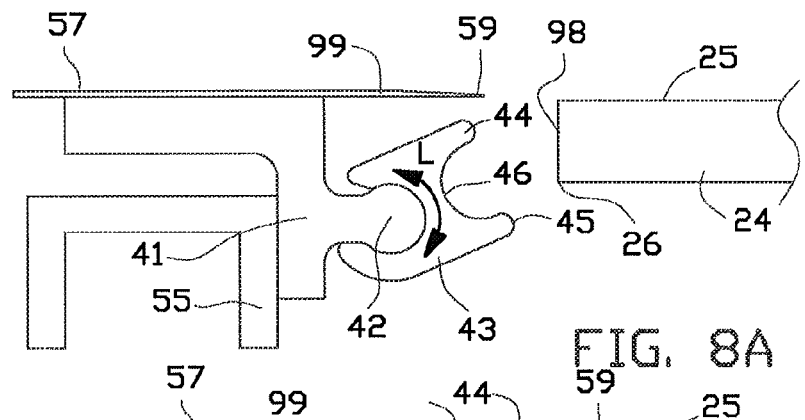
FIGS. 8A and 8B are cross sections of the docking parts according to FIG. 7, in subsequent docking steps.
Figure 8B:
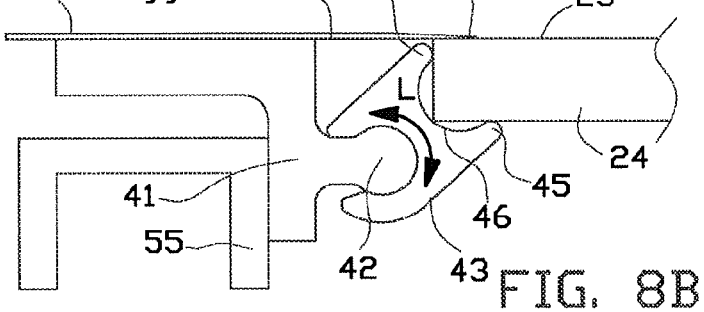

FIGS. 7 and 8B disclose in more detail the engagement of the shelf 24 by the mobile transport vehicle 30 at the freely accessible side edge 98 of the fourth shelf 24. FIG. 8A discloses the engaging parts just before said engagement. As shown, the front bar 55 of the frame 54 is provided with multiple brackets 41 distributed along the front bar 55, which support the vial support plate 57. The vial support plate 57 extends partly over the front bar 55 and the brackets 41 to form a plate shaped abutment extension 99 having a tapered end edge 59. The brackets 41 are each provided with a knee joint extension 42 on the side facing away from the front bar 55. Each knee joint extension 42 is engaged by a gripping extension, which comprises a gripper 43 that is made of a flexible material, such as rubber. The gripper 43 is thereby swingable in a vertical plane in direction S. Due to the applied materials and the fitting, the grippers 43 maintain their orientation with respect to the bracket 41 in direction L until an external force or torque is applied that exceeds a predetermined threshold value.

The grippers 43 comprise an upper finger 44 and a lower finger 45 that define a confinement aperture 46. The fingers 44, 45 and the confinement aperture 45 are directed upwards towards the tapered end edge 59, wherein the distance between the tapered end edge 59 and the fingers 44, 45 is such that the shelf 24 can be brought under and in abutment with the tapered end edge 59 while its lower corner edge 26 enters the confinement aperture 46.

Figure 8C:
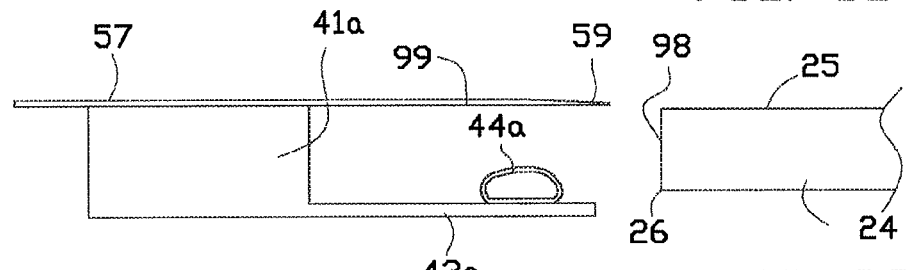
FIGS. 8C-8E are alternative docking parts.
Figure 8D:
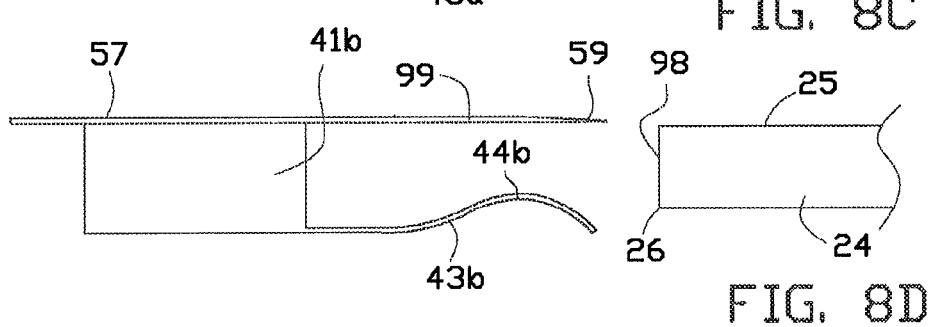
Figure 8E:
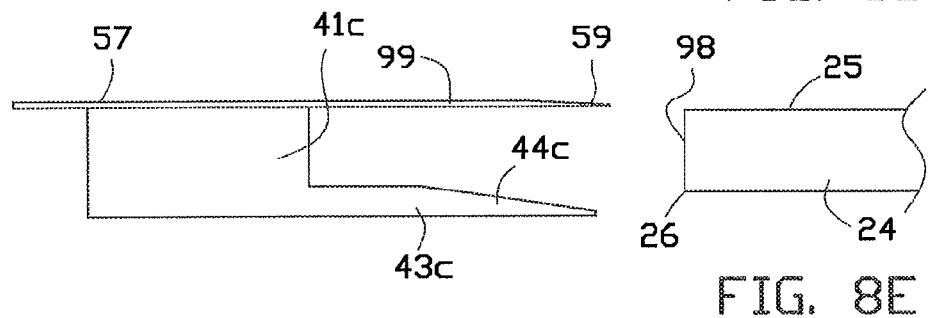

FIGS. 8C-8E show different embodiments of the engaging parts. According to FIG. 8C, the vial support plate 57 is supported by a bracket 41a having a gripping extension 43a substantially parallel and spaced apart from the tapered end edge 59. The gripping extension 43a is provided with a cushion 44a made of a flexible material, such as rubber, that is positioned under the tapered end edge 59. The distance between the tapered end edge 59 and the cushion 44a is such that the shelf 24 can be brought under and in abutment with the tapered end edge 59 while its lower corner edge 26 abuts the upper part of the cushion 44a.

According to FIG. 8D, the vial support plate 57 is supported by a bracket 41b having a curved and resilient gripping extension 43b spaced apart from the tapered end edge 59. The distance between the tapered end edge 59 and the resilient gripping extension 43c is such that the shelf 24 can be brought under and in abutment with the tapered end edge 59 while its lower corner edge 26 is resiliently engaged by the curved part 44b of the resilient gripping extension 43b.

According to FIG. 8E, the vial support plate 57 is supported by a bracket 41c having a rigid gripping extension 43c having a tapered end section 44c. The distance between the tapered end edge 59 and the rigid gripping extension 43c is such that the shelf 24 can be brought under and in abutment with the tapered end edge 59 while its lower corner edge 26 is clampingly engaged by the tapered end section 44c.

FIG. 9 shows a typical floor plan for applying the invention. On the clean room floor 100 the freeze dryer 1 forms part of a series together with three other, identical freeze dryers 401, 501, 601. At one side, a vial loading and unloading station 700 is provided, which, for example, comprises a vial single lining device to scan or mark the vials 101. FIGS. 10A and 10B, and FIGS. 11A and 11B show the handling of the vials 101 respectively at loading and unloading the freeze dryer 2. At the freeze dryer 1 and the mobile transport vehicle 30 the vials 101 are grouped into vial packs 102, 103. A vial pack 102, 103 comprises multiple straight rows of vials 101 which are mutually staggered half a vial width to form a dense collection of hexagonally packed vials.

When vials 101 are loaded into the empty freeze dryer 1, the mobile transport vehicle 30 firstly moves to the loading station 700 to load a first vial pack 102. When loaded, the first vial pack 102 is positioned in the middle of the vial support plate 57, surrounded and confined by the frame bars 61, the vial pushing shovel 70 and the vial pulling shovel 80 which is in its lower shovel position. The vial support plate 57 and the vial shifter 60 are positioned in their entirety inside the storage housing 33 of which the access opening 40 is closed.

After loading, the mobile transport vehicle 30 moves according to trajectory R towards the freeze dryer 1 as shown in FIG. 9, wherein the access opening 40 of the mobile transport vehicle 30 is positioned in front of the access opening 11 of the freeze dryer 1 as shown in FIGS. 1-4. Just before arrival, the sliding door 12 of the freeze dryer 1 is opened and an empty shelve 24 to be loaded is moved in its vertical direction A to be accessible via the access opening 11. The movement according to trajectory R, ending in front of the freeze dryer 1 is executed by the undercarriage 31, which forms a first, rough positioning. The vial support plate 57 then extends in front of and some centimeters spaced apart from the empty shelf 24, with the lower side of its tapered end 59 in vertical direction some millimeters above the empty shelf 24 and with the grippers 43 positioned upwards to receive the lower edge 26 of the empty shelf 24 as shown in FIG. 8A.

Subsequently, the vial support plate 58 is brought towards the empty shelf 24 to be docked by sliding the carrier bars 52 along the rails 51 to move the frame 54 toward the empty shelf 24. Due to the initially maintained extended position of the two biased gas springs 56, the vial support plate 57 and the frame 54 move simultaneously until at least one of the grippers 43 engages the lower edge 26 of the empty shelf 24. After this first engagement, the frame 54 continues its movement in direction P while the gas spring 56 that is closest to the first engaged gripper 43 is pushed in direction Q1/Q2 against its biasing force to compensate the continued movement of the frame 54. The movement of the frame 54 is continued to let all the grippers 43 confine the lower edge 26 in their apertures 46. In this manner the vial support plate 57 can swivel about the vertical axis Z while slidingly supported on the frame until all the grippers 43 have made their initial engagement and the tapered end 59 has become right above the empty shelf 24. The frame 54 pushes on in direction R in order to urge the resilient grippers 43 to slightly rotate upwardly in direction L towards the tapered end 59. In this manner the vial supporting plate 57 is pushed down slightly under some resiliency provided by the undercarriage in order to place the tapered end 59 over its entire width tightly against the flat supporting surface 25.

Subsequently, the fourth servo motors 95 are powered to move the brackets 93 into the extended position in direction U and the third servo motor inside the drive housing 63 is powered to move the drive rods 90 in direction T to their extended position as both shown in FIG. 3. Thereby the first vial pack 102 is shifted from the vial support plate 57 onto the second half of the empty shelf 24 in direction G by the vial pushing shovel 70 as shown in FIG. 10A while kept confined between the frame bars 61 and the vial pulling shovel 80. Subsequently, the vial pulling shovel 80 is moved in direction N into its upper passing over position as shown in FIG. 6A, and the vial support plate 57 and the vial shifter 60 are brought back into the fully retracted position inside the storage chamber 39. After closing the access opening 40 the mobile transport vehicle 30 moves according to trajectory T towards the loading station 700 as shown in FIG. 9 to pick up a second vial pack 103.

Subsequently, the mobile transport vehicle 30 moves to the freeze dryer 1 according to trajectory R again to dock as already described. After docking, only the fourth linear servo motors 95 are powered to move the brackets 93 into the extended position in direction U. Thereby the second vial pack 103 is shifted in direction H from the vial support plate 57 onto the first half of the partly loaded shelf 24 by the vial pushing shovel 70 as shown in FIG. 10B while kept confined between the frame bars 61 and the vial pulling shovel 80. Between the first vial pack 102 and the second vial pack 103 an elongated space 104 is kept free, having a width which in this example is substantially equal to the diameter of one of the vials 101. Subsequently, the vial pulling shovel 80 is moved in direction N into its upper passing over position as shown in FIG. 6A in order to be lifted out of the elongated space 104, and the vial support plate 57 and the vial shifter 60 are brought back into the retracted position inside the storage chamber 39. Above mentioned steps can be repeated for all the shelves 21-24 in order to fully load the freeze dryer 1 and the other freeze dryers 401, 501, 601.

In this example the elongated space 104 has a width which is substantially equal to the diameter of one of the vials 101. Alternatively the width of the elongated space 104 is smaller or larger than the diameter of one of the vials 101. It is essential that the width is sufficient for movement of the vial pulling shovel 80 to freely move in direction N into and out of the elongated space 104.

After running a freeze drying process inside the drying chamber 10, the freeze dryer 1 is unloaded. Thereto the sliding door 12 is opened, one of the shelves 24 is moved in front of the access opening 11 and the mobile transport vehicle 30 is moved according to trajectory R towards the freeze dryer 1 to dock against the loaded shelf 24 as described before. Subsequently, the vial pulling shovel 70 is moved in direction N into its upper passing over position as shown in FIG. 6A, and the fourth servo motors 95 are powered to move the brackets 93 into the extended position in direction U as shown in FIG. 3. In this manner the vial pulling shovel 70 passes over the second vial pack 103 while the vial pushing shovel 70 is brought against or at a short distance less than a vial diameter in front of the second vial pack 103. Subsequently the vial pulling shovel 80 is moved in direction N into its lower shovel position as shown in FIG. 6C while entering the separation space 104, where after the fourth servo motors 95 are powered to move the brackets 93 into the retracted position in direction U. In this manner the vial pulling shovel 80 shifts the second vial pack 103 in direction J from the shelf 24 onto the vial support plate 57 as shown in FIG. 11A.

Subsequently, the second vial pack 103 is unloaded at the unloading station 700, where after the vial support plate 57 is docked again against the partly unloaded shelf 24. Subsequently, the vial pulling shovel 80 is moved in direction N into its upper passing over position as shown in FIG. 6A, and the fourth servo motors 95 are powered to move the brackets 93 into the extended position in direction U and the third servo motor inside the drive housing 63 is powered to move the drive rods 90 in direction T to their extended position as both shown in FIG. 3. In this manner the vial pulling shovel 80 passes over the first vial pack 102 while the vial pushing shovel 70 is brought against or at a short distance less than a vial diameter in front of the first vial pack 102. Subsequently, the vial pulling shovel 80 is moved in direction N into its lower shovel position as shown in FIG. 6C, where after the fourth servo motors 95 and the third servo motor inside the drive housing 63 are powered to move the brackets 93 into the retracted position in direction U and to retract the drive rods 90 into the drive housing 63. In this manner the vial pulling shovel 80 shifts the first vial pack 102 in direction K from the shelf 24 onto the vial support plate 57 as shown in FIG. 11B.

As described, the vial pulling shovel 80 is moved in direction N into its lower shovel position as shown in FIG. 6C while entering the separation space 104. During downward movement, the servo motor for the vial pulling shovel 80 monitors unexpected counter forces against the vial pushing shovel 80. Such counter forces can be caused by unintentially displaced or fallen vials 101a at the edge of the vial pack 102, 103. When the servo motor senses such resistance, it is concluded that a displaced or fallen vial 101a is hit by the shovel edge 88 as shown in FIG. 6B. In that case the vial pulling shovel 80 is brought back to its passing over position as shown in FIG. 6A, the third servo motor is powered to bring the vial pulling shovel 80 some millimeters further away from the frame 54, and the vial pulling shovel 80 is lowered again. This sequence is repeated until the lower shovel position according to FIG. 6C has been reached or until a predetermined amount of attempts or time have been lapsed. In this manner a complete vial pack 102, 103 can be removed from the shelves 21-24.

By separately and subsequently handling multiple vial packs 102, 103 per shelf 21-24, the risk of rejection of a vial pack 102, 103 due to a fallen vial 101a is lower than when a single, larger shelf-covering vial pack is displaced.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. A method for transfer of containers or vials, between a freeze dryer that is located at a first location and a separate transport vehicle that is mobile with respect to the freeze dryer, wherein the freeze dryer comprises a freeze dryer housing with an access opening towards an inner freeze drying chamber inside the freeze dryer housing, multiple shelves that are arranged spaced apart above each other inside the freeze dryer chamber and each provided with a horizontally extending first flat supporting surface for supporting the containers, wherein the mobile transport vehicle comprises a mobile undercarriage supporting a storage housing with an access opening towards an inner storage chamber, a carrier provided with a second flat supporting surface for supporting the containers inside the storage housing, and a container shifter for pushing out containers away from the second flat supporting surface in a pushing out direction parallel to the second flat supporting surface, wherein the method comprises for a first shelf aligning the carrier and the shelf and by means of the container shifter pushing out a first container pack of multiple mutually abutting containers from the second flat supporting surface onto the first flat supporting surface of the first shelf reversing the container shifter and subsequently pushing out a second container pack of multiple mutually abutting containers from the second flat supporting surface onto the first flat supporting surface of the first shelf while leaving an elongated separation space free between the first container pack and the second container pack on the first shelf, running a freeze drying, process inside the freeze dryer,
unloading the container packs from the shelf,
wherein the unloading comprises per shelf aligning the shelf and the carrier,
moving the container shifter to enter the elongated separation free space,
by means of the container shifter pulling in the second container pack from the first flat supporting surface onto the second flat supporting surface in a pulling in direction parallel to the second flat supporting surface, and
extending the container shifter in an extending direction opposite the pushing in direction and subsequently pulling in the first container pack from the first flat supporting surface onto the second fat supporting surface.

2. Method according to claim 1, wherein the separation space extends transverse to the pushing out direction.

3. Method according to claim 1, wherein the separation space has in the pushing out direction a width that is equal or larger than the largest outer width of one of the containers in that direction.

4. Method according to claim 1, wherein the containers of the container packs are arranged in rows that extend transverse to the pushing out direction, wherein the successive rows are mutually staggered transverse to the pushing out direction half a container width.

5. Method according claim 1, wherein the containers are identical regarding size and shape.

6. Method according to claim 1, comprising, after pushing out the first container pack onto the first flat supporting surface, moving the transport vehicle to a loading station that is located at a second location at a distance or remote from the first location and loading the second container pack onto the second flat supporting surface.

7. Method according to claim 1, comprising, after loading the first and second container pack onto the shelf or shelves, running a freeze drying process inside the freeze dryer.

8. Method according to claim 1, wherein the container shifter comprises a container pushing shovel that is moveable in the pushing out direction for engagement of a side of the container pack.

9. Method according claim 1, comprising, after loading the first and second container pack onto the shelf or shelves, unloading the container packs from the shelve or shelves by means of the transport vehicle.

10. Method according to claim 9, comprising per shelf aligning the shelf and the carrier and by means of the container shifter pulling in the second container pack from the first flat supporting surface onto the second flat supporting surface in a pulling in direction parallel to the second flat supporting surface, extending the container shifter in an extending direction opposite the pushing in direction and subsequently pulling in the first container pack from the first flat supporting surface onto the second flat supporting surface.

11. Method according to claim 10, wherein the container shifter comprises a container pulling shovel that is moveable in the pulling in direction and that is moveable in a direction transverse to the pulling in direction between a passing over position in which the container pulling shovel passes freely over the first or second container pack in the extending direction and a lower shovel position in which the container pulling shovel engages a side of the first or second container pack in the pulling in direction, wherein the method comprises moving the container pulling shovel in its passing over position in the extending direction towards and past the side of the first or second container pack, moving the container pulling shovel in the shovel position and moving the container pulling shovel in the pulling in direction for engagement of the side of the first or second container pack, and pulling in the container pack along the first flat support surface.

12. Method according to claim 11, wherein the container shifter comprises a detector for detecting an engagement of the container pulling shovel onto a container, wherein the method comprises moving the container pulling shovel from the passing over position towards the shovel position while detecting an engagement of the container pulling shovel onto a container, wherein the movement of the container pulling shovel is stopped or reversed when an engagement of the container pulling shovel onto a container is detected before the container pulling shovel has reached its shovel position.

13. Method according to claim 12, wherein the method comprises reversing the movement of the container pulling shovel when the engagement of the container pulling shovel and the container is detected before the container pulling shovel has reached its lower shovel position, moving the container pulling shovel in the extending direction over a distance which is less than the largest outer width of a container, and moving the container pulling shovel towards the shovel position again while detecting an engagement of the container pulling shovel onto a container.

14. Method according to claim 13, comprising repeating said reversing the movement of the container pulling shovel when an engagement of the container pulling shovel onto a container is detected before the container pulling shovel has reached its shovel position, said moving the container pulling shovel in the extending direction over a distance which is less than the largest outer width of a container, and said moving the container pulling shovel towards the shovel position while detecting an engagement of the container pulling shovel onto a container until the container pulling shovel has reached the shovel position or until a predetermined maximum number of attempts have passed.

15. Method according to claim 11, comprising, for the second container pack, moving the container pulling shovel to the shovel position by insertion into the elongated separation space.

16. Method according to claim 9, comprising, after pulling in the second container pack onto the second flat supporting surface, moving the transport vehicle to a discharging station that is located at a third location at a distance or remote from the first location and discharging the second container pack from the second flat supporting surface.

17. Assembly of a freeze dryer and a separate transport vehicle that is mobile with respect to the freeze dryer, wherein the freeze dryer comprises a freeze dryer housing with an access opening towards an inner freeze drying chamber inside the freeze dryer housing, multiple shelves that are arranged spaced apart above each other inside the freeze dryer chamber and provided with a horizontally extending first flat supporting surface for supporting containers, or vials, and a side edge in front of the access opening, wherein the mobile transport vehicle comprises a mobile undercarriage supporting, a storage housing with an access opening towards an inner storage chamber, a carrier provided with a second flat supporting surface for supporting the containers inside the storage housing, and a container shifter for pushing out containers away from the second flat supporting surface in a pushing out direction parallel to the second flat supporting surface, wherein the carrier comprises a plate shaped abutment extension on which a part of the second flat supporting surface or its elongation extends, a front mounting part under the abutment extension, and a gripping extension that is connected to the front mounting part and that is at least partly directed towards the abutment extension, wherein the transport vehicle is configured for aligning the carrier with one of the shelves on a vertical height in which the abutment extension extends above the first flat supporting surface and the gripping extension at least partly extends under the side edge, and for moving the carrier towards that shelf in order to confine the side edge between the abutment extension and the gripping extension.

18. Assembly according to claim 17, wherein the gripping extension comprises a gripper that is provided with a freely extending engagement end for engagement of the side edge, wherein the engagement end is moveable with respect to the abutment extension in a vertical plane.

19. Assembly according to claim 18, wherein the gripper is hingeably connected to the mounting part.

20. Assembly according to claim 18, wherein the engagement end is provided with a recession for confinement of at least a part of the side edge.

21. Assembly according to claim 17, wherein the gripping extension is made of a resilient material, preferably a rubber based material.

22. Assembly according to claim 17, wherein the transport vehicle is provided with multiple gripping extensions that are distributed along the abutment extension.

23. Assembly according to claim 17, wherein the transport vehicle is provided with a translation mechanism for supporting and linearly translating the carrier with respect to the undercarriage in a horizontal direction through the access opening of the storage housing, wherein the carrier is slidably supported on the translation mechanism for a swivelling movement of the carrier with respect to the translation mechanism in a horizontal plane.

24. Assembly according to claim 23, wherein the transport vehicle is provided with two spaced apart springs that at the side of the abutment extension connect the carrier to the translation mechanism, wherein the springs each allow a translation of a front part of the carrier with respect to the translation mechanism in the translating direction of the translation mechanism.

25. Assembly according to claim 24, wherein the transport vehicle comprises dampers for damping the movement of the springs.

26. Assembly according to claim 24, wherein the springs are damped gas springs.

* * * * *